United States Patent [19]

Miki et al.

[11] 4,148,250

[45] Apr. 10, 1979

[54] MEANS FOR EXHAUSTING VAPORS FROM A STEAM COOKER

[75] Inventors: Yasumasa Miki, Daito; Hideo Nakanishi, Osaka, both of Japan

[73] Assignee: Matsushita Electric Industrial Co., Ltd., Osaka, Japan

[21] Appl. No.: 812,424

[22] Filed: Jul. 1, 1977

[30] Foreign Application Priority Data

Jul. 13, 1976 [JP] Japan .................................. 51-83628

[51] Int. Cl.² .............................................. A47J 27/08
[52] U.S. Cl. ........................................ 99/403; 99/415; 220/374
[58] Field of Search .................. 99/403, 401, 410, 411, 99/412, 413, 414, 415, 416, 417, 418, 447, 345; 126/41 R, 275 R, 390; 220/366, 367, 374

[56] References Cited

U.S. PATENT DOCUMENTS

| | | | |
|---|---|---|---|
| 1,147,785 | 7/1915 | Coffin | 220/314 |
| 1,432,407 | 10/1922 | Mieville | 99/345 |
| 1,695,358 | 12/1928 | Appleman | 220/374 X |
| 1,740,205 | 12/1929 | Schmidt | 99/415 X |
| 3,194,662 | 7/1965 | Nelson | 99/403 X |
| 3,280,722 | 10/1966 | Rahauser | 99/403 X |
| 3,636,860 | 1/1972 | Green | 99/418 X |
| 3,801,331 | 4/1974 | Sano et al. | 99/403 |

Primary Examiner—Harvey C. Hornsby
Assistant Examiner—Arthur O. Henderson
Attorney, Agent, or Firm—Stevens, Davis, Miller & Mosher

[57] ABSTRACT

A means provided for exhausting vapors from a cooker for steam cooking rice and/or other foodstuffs contained in a cooking pot wherein the water in the cooker is heated by a heater provided within the main body of the cooker. The means includes a cylindrical member which forms a hole in an inner lid of the cooking pot, which hole communicates with the interior of the cooking pot, an annular wall around said cylindrical member, an annular vapor guide member suspended from the outer lid down between said cylindrical member and annular wall, back flow holes provided in the inner lid at the place inside the guide member, and exhaust openings provided outside the outer lid. The means not only collectively exhausts the vapors to be generated during cooking from the exhaust openings but also prevents liquid from the rice being boiled over.

7 Claims, 4 Drawing Figures

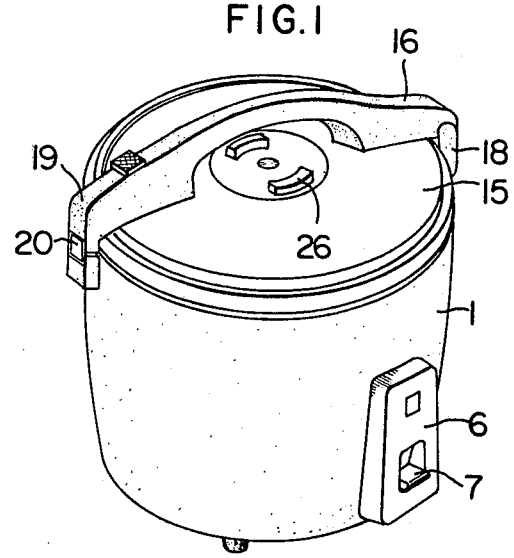
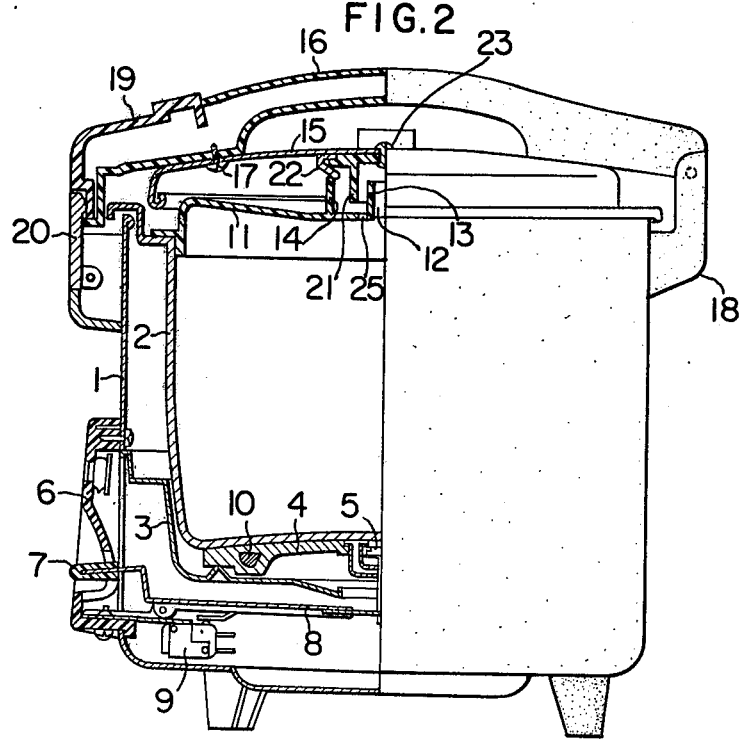

MEANS FOR EXHAUSTING VAPORS FROM A STEAM COOKER

The present invention relates to a means for exhausting steam and vapors from a cooker which is capable of exhausting the vapors generated during cooking and also completely prevents the liquid from bubbling over.

In steam cookers such as conventional rice cookers, the vapors generated within the pot have been heretofore released from the periphery of the outer lids. The defect of such steam cookers, however, is that the entire internal surfaces of the outer lids is exposed to the vapors which are deposited thereon because of the difference in temperature between the internal surfaces of the outer lids and the atmosphere. This dew, if the outer lid is in a free state, can drop back into the pot or into another container when the cooker is handled with a certain degree of care by the user. However, when an outer lid in which movement is limited by a hinge mechanism, etc. is employed, the dew can not be disposed of in such a way thus requiring the provision of a receptacle at the hinge portion for its disposal. This complicates the construction of the steam cooker complicate. There have been made several proposals to collectively releasing the vapors but these means release only the vapors. They do not prevent liquid from the rice from boiling over, thus requiring a wide space for keeping the rice liquid within the lid portion (for instance, a space between the inner lid and outer lid), and can not eliminate the necessity of a dew retainer for a lid with a hinge mechanism, as they still do not prevent the vapors from depositing onto the internal surface of the inner lid.

It is an object of this invention to provide means for exhausting the vapors of a steam cooker which is capable of releasing only the vapors to be generated during the cooking and of preventing the liquid from the rice from bubbling over.

It is another object of this invention to provide a means for exhausting vapors of a steam cooker which prevents the vapors from depositing on the internal surface of its outer lid by providing a passage for discharging the vapors to be generated during the cooking.

It is a further object of this invention to provide a means for exhausting vapors of a steam cooker which eliminates the necessity of providing a dew retainer to such an outer lid of a steam cooker that is provided with a hinge mechanism for easy pivotal opening and closing.

It is still another object of this invention to provide a means for exhausting vapors of a steam cooker which is adapted to direct the discharging vapors in such a direction that the vapors will not hurt the hand gripping the handle provided on the outer lid of a steam cooker.

FIG. 1 is a perspective view showing the external appearance of a steam cooker provided with a means for exhausting vapors in the cooker in accordance with the present invention.

FIG. 2 is a half-cut cross sectional view of the steam cooker.

Figure 3:
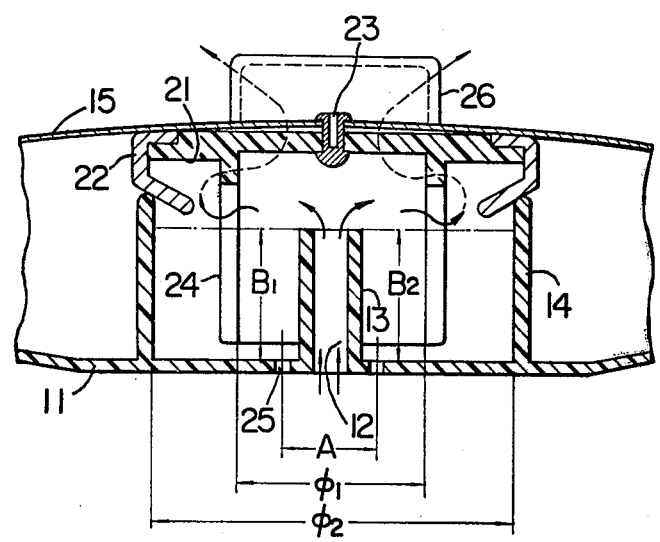
FIG. 3 is an enlarged cross sectional view showing the important portion of the means for exhausting the vapors in accordance with the present invention.

Now the present invention will be explained with reference to the attached drawing in which one embodiment of the invention is illustrated.

1 is the main body of a steam cooker and 2 is a closed bottom cooking pot of a cylindrical shape removably placed inside the main body 1 on a heating plate 4 which is supported by a protective frame 3. 5 is a thermal responsive means which displaces itself, sensing the temperature at the bottom of the cooking pot 2 and is connected via a transmission lever 8 to a push button 7 for starting the cooking which faces the indication block 6. 9 is a micro switch which will turn on and off in response to the displacement of the thermal responsive means 5. It is connected in series with a sheathed heater 10 buried in the heating plate 4. 11 is an inside lid made of synthetic resin for covering the top opening of the cooking pot 2. This lid is provided with a cylindrical member 13, which, having a through hole 12, is formed integrally with the lid, and with an annular wall 14 positioned outwardly of the cylindrical member 13 and formed also integrally therewith. 15 is an outer lid which is adapted to be positioned above the internal lid 11 and is fastened with screws 17 to a bridge-like handle 16 which is pivotally mounted on a hinge 18 provided on the outer surface of the main body 1. 19 is a lever movably attached to the handle 16 for engaging and disengaging the handle 16 with a hook 20 which is pivotally attached to the outer surface of the main body 1 on the side opposite the side where the hinge 18 is located. 21 is an annular vapor guide member positioned between the cylindrical member 13 and the annular wall 14, which guide member hangs down leaving a gap with the inner lid 11. This vapor guide member 21 is fastened with a rivet 23 to the outer lid 15 via a packing 22, a part of which is in close contact with the top of the annular wall 14. 24 is a plurality of slits made in the vapor guide member 21 from the bottom end thereof. The slits 24 are made in such a way that their top limits are above the top end of the cylindrical member 13. 25 are back-flow holes provided in the inner lid 11 at the position between the cylindrical member 13 and the vapor guide member 21 for returning liquid from the rice. 26 are exhaust openings formed integrally with the vapor guide member 21 and positioned over that portion of the outer lid 15 between the vapor guide member 21 and the annular wall 14 at locations displaced 45° to 180° from the positions of the slits 24 in the vapor guide member 21. Incidentally, the discharging direction of the vapors out of the exhaust openings 26 are set perpendicular to the bridging direction of the handle 16.

Figure 4:
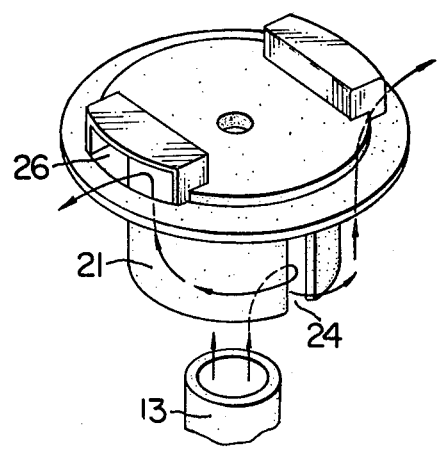
FIG. 4 is a partial perspective view of the vapor exhausting means to explain the passage of vapors.

Now the mode of operation of the means for exhausting vapors having the structure described above will be explained. First, when the button 7 for starting the cooking is pushed, the micro switch 9 is turned on and passes electric current to the sheathed heater 10 buried in the heating plate 4. Then the sheathed heater 10 generates heat and heats the cooking pot 2 which contains the foodstuffs for cooking. As a result, vapors and bubbles are generated in the cooking pot. These vapors and bubbles together flow out through the hole 12 provided in the inner lid 11. These will be once trapped within the limit shown by the inner diameter $\phi_1$ of the vapor guide member 21 where the bubbles will be decelerated from their flowing velocity and gather as liquid from the rice while only the vapors will pass through the slits 24 provided in the vapor guide member 21 into the passage provided at the location defined between the diameter $\phi_1$ and the inner diameter of the annular wall $\phi_2$ and be emitted from the exhaust openings 26 provided integrally to the vapor guide member 21. (The arrows in FIG. 4 indicate the passage of the discharging vapors.)

The bubbles which have lost their flow velocity and turned into liquid from the rice accumulate up to the height shown by symbol $B_1$ and the vapors pass out from the slits 24 of the vapor guide 21 within the range defined by the symbols $B_2 - B_1$. The dimensions $B_1$ and $B_2$ were obtained experimentally. If the dimension $B_1$ is small, the space for collecting the liquid from the rice is too small to prevent the liquid from being blown up by the jet force of the vapors and liquid would flow out of the exhaust openings 26 provided integrally to the vapor guide member 21. The same is true when the diameter $\phi_2$ of the annular wall 14 is too small. The relative dimensions $B_1$, $B_2$, $\phi_1$ and $\phi_2$ were obtained through various tests.

The pitch A for the back flow holes 25 provided for the purpose of returning the liquid from the rice collected there back into the cooking pot should be of such a dimension that the back flow holes 25 may always come within the diameter $\phi_1$, as there are possibilities that the collected liquid might be blown upwards by the vapors which would also flow out through these holes 25 depending on the vapor pressure produced in the cooking pot. The liquid bubbles thus blown up will break in the space within the diameter $\phi_1$, if they are within the diameter $\phi_1$ but should they be outside the diameter $\phi_1$, the blown-up bubbles would be directly blown off through the exhaust openings 26 provided integrally to the vapor guide member 21, and the rice liquid would be spilt out of the cooker.

In the embodiment described above, the inner lid 11 is formed of synthetic resin incorporating the integrally formed cylindrical member 13 and annular wall 14. These, however, can be made separately and when the inner lid 11 is made of metal, the annular wall 14, if made of plastic, can be effectively utilized as a knob of the inner lid 11. Also the hook 20 is operated by the operating lever 19 for engaging and disengaging the handle 16 with the main body 1 in the embodiment shown here but such hook can be provided at the tip of the lever 19 for direct engagement and disengagement of the handle 16 with the main body 1 by the lever 19.

As clear from the foregoing explanation, according to the present invention, the bubbles generated in the cooking pot will be broken during the course of the vapor discharge, releasing only the vapors into the atmosphere. The vapors will not deposit on the internal surface of the outer lid and, therefore, no vapor receiver is needed even for the lid of which movement is limited by a hinge mechanism, etc. and thus the structure is simplified. A steam cooker having the means for exhausting vapors in accordance with this invention can be kept sanitary and the lid and other parts can be easily washed as it surely prevents even viscous materials from boiling over. It has a further advantage that the cooked food will not lose its taste or nutrients because of the back flow of the bubbles.

What is claimed is:

1. A means for exhausting vapors from a steam cooker comprising
   (a) an inner lid adapted to cover the top opening of a cooking pot to be placed in the main body of the steam cooker;
   (b) a cylindrical member attached to said inner lid having a hole communicating with the interior of said cooking pot and protruding upwardly from said inner lid;
   (c) an annular wall attached to said inner lid, said annular wall surrounding said cylindrical member;
   (d) an outer lid of said cooking pot positioned above said inner lid;
   (e) an annular vapor guide member provided on said outer lid at the side facing said inner lid, said vapor guide member being positioned between said cylindrical member and said annular wall and suspended in such a way that the lower end thereof is spaced from said inner lid and extends below the upper end of said cylindrical member;
   (f) back flow holes provided in said inner lid between said cylindrical member and said vapor guide member, and
   (g) exhaust openings for exhausting vapors provided in a portion of said outer lid between said vapor guide member and said annular wall.

2. A means for exhausting vapors as set forth in claim 1, wherein said vapor guide member is provided with slits extending from the lower end thereof to the position where the top of these slits is above the top end of said cylindrical member.

3. A means for exhausting vapors as set forth in claim 2, wherein said slits are provided around the vertical axis passing through the center of said outer lid, and displaced 45° to 180° with respect to said exhaust openings.

4. A means for exhausting vapors as set forth in claim 1, wherein said vapor guide member having said exhaust openings is formed as an integral piece, said integral piece being attached to said outer lid with a packing therebetween, a part of said packing being adapted to make tight contact with said annular wall.

5. A means for exhausting vapors as set forth in claim 1, which further comprises a bridge-like handle fastened to the top surface of said outer lid, one end of said handle being pivotally mounted so as to turn freely on a hinge portion provided on the external surface of the main body of said steam cooker, and an operating lever provided at the other end of said handle to engage and disengage said handle with said main body of the steam cooker.

6. A means for exhausting vapors as set forth in claim 5, wherein said exhaust openings and said handle are disposed in such a way that the directions in which vapors discharge from said exhaust openings are substantially perpendicular to the bridging direction of said handle.

7. Apparatus for exhausting vapors from a steam cooker having a main body, comprising
   a cooking pot removably positioned within said main body of said steam cooker,
   an inner lid for covering the top opening of said cooking pot, said inner lid having a cylindrical member and an annular wall protruding upwardly therefrom, said cylindrical member surrounding an aperture in said inner lid and said circular wall surrounding said cylindrical member, said inner lid further having back flow holes located therein adjacent the outer surface of said cylindrical member,
   an outer lid positioned within said main body above said inner lid, said outer lid having exhaust openings therein,
   an annular vapor guide member secured to said outer lid and projecting toward said inner lid, said vapor guide member having a slitted portion positioned between the back flow holes in said inner lid and said annular wall, said slitted portion having a lower end spaced from said inner lid and extending below the upper end of said cylindrical member, the slits of said slitted portion being located about the vertical axis through the center of said outer lid and displaced by 45° to 180° with respect to said exhaust openings, and packing means located between the outer periphery of said vapor guide member and the top of said annular wall.

* * * * *